INVENTORS
GERHART L. HAMBURGER
DEREK J. DEAN
By Irwin S. Thompson
ATTY.

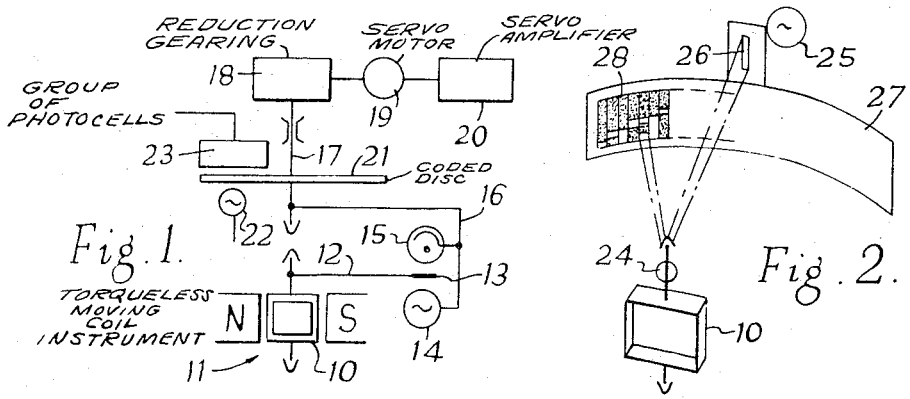
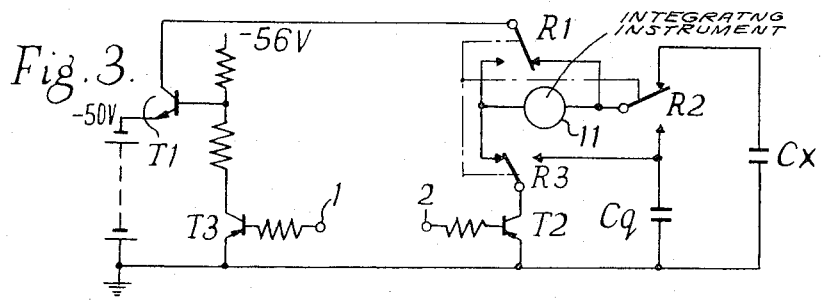
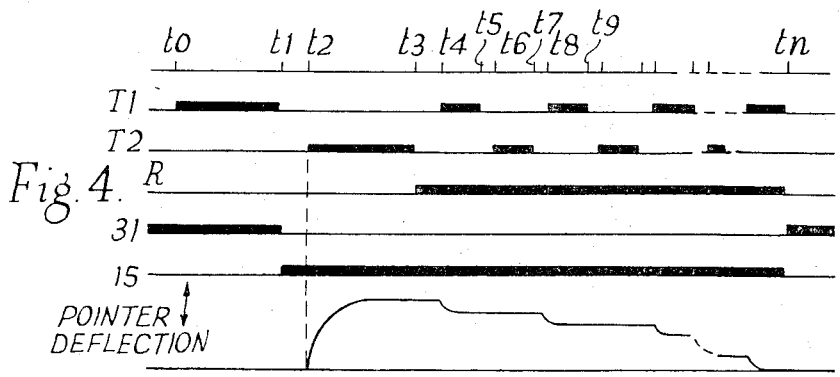
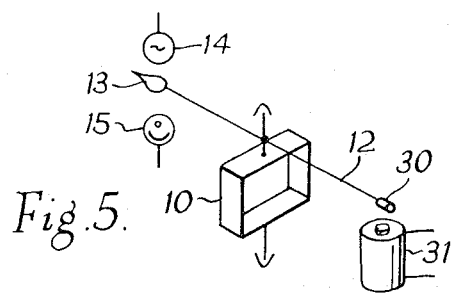

United States Patent Office 3,370,229
Patented Feb. 20, 1968

3,370,229
ELECTRICAL CAPACITANCE MEASURING METHOD AND APPARATUS WITH DIGITAL FORM INDICATION
Gerhart Lothar Hamburger, Hitchin, and Derek John Dean, Pottersbar, England, assignors to Sangamo Weston Limited, Enfield, Middlesex, England, a British company
Filed May 25, 1964, Ser. No. 369,989
17 Claims. (Cl. 324—60)

ABSTRACT OF THE DISCLOSURE

Method and apparatus for measuring electrical capacitance in which the capacitance is first charged to a given voltage and is then fully discharged through an integrating meter mechanism having a movable member which is displaced from an initial zero position to a position representing the current/time integral of the discharge current flow and in which such movable member is then returned to its initial position by means of a series of current pulses of known current/time integral value, the number of return pulses necessary being counted and used as a measure of the capacitance value. The metering mechanism is conveniently a torqueless moving coil measuring instrument. The return pulses are preferably derived by charging and discharging a capacitor of known value from the same potential source as that employed to charge the capacitance under measurement.

---

This invention relates to the measurement of electrical capacitance and is more particularly concerned with the presentation of the measured capacitance value in digital form, for instance, as an electric pulse signal train. The invention is of particular application to the measurement of high capacitance values, e.g. of the order of thousands of microfarads. A particular, although not exclusive, application of the invention is to the measurement of the number of subscribers actively connected at a given time instant to a radio or television signal distribution conductor network using the methods and arrangements described in U.S. Patent No. 3,263,787, issued August 2, 1966.

The method employed in the present invention is that of charging the capacitance to a certain voltage and then discharging it through an integrating meter mechanism which serves to measure the current versus time integral or, in other words, the charge. The integrating means employed can be of any suitable type such as a linear electronic amplifier with capacitive feedback or, more preferably and in accordance with another aspect of the invention, a torqueless moving coil electrical measuring instrument.

If a constant current is passed through the coil of such an instrument and if the coil is supplied through ligaments or like means, which impose substantially zero control torque on the coil, the coil will move uniformly through a uniform magnetic field at a speed proportional to the current. Correspondingly the application to such coil of the discharge current pulse from capacitance under measurement will result in the coil being deflected through a distance which is proportional to the time integral of the pulse regardless of the actual amplitude versus time waveform of the pulse itself.

Since the coil will remain stationary after the current pulse has ceased, its new position, relative to its starting position, is a measure to the charge value and by the provision of a suitable scale such charge value can be read off. If the charging voltage for the capacitance is kept to an accurately known and constant value, the scale can be calibrated directly in capacitance values, e.g. in microfarads.

To effect digital read out with such an arrangement by direct operation of any digit signalling device is normally impracticable in view of the delicate nature of the indicating instrument and one object of this invention relates to the provision of means for providing a digital output without demanding power from such a moving coil instrument.

In order that the nature of the invention may be more readily understood, a number of different arrangements will now be described by way of illustrative example only and with reference to the accompanying drawings, in which:

FIGURE 1 is a schematic diagram of one arrangement employing servo follow-up mechanism to provide a digital form of output indication from a moving coil type instrument whose moving coil is deflected by discharge current from the capacitance under measurement.

FIGURE 2 is a similar schematic diagram of an alternative arrangement employing an electro-optical readout method.

FIGURE 3 is a circuit diagram of one preferred arrangement in accordance with this invention which is particularly adapted for use in a subscription radio or television signal distribution system for determining the number of active subscribers in the manner described in the aforesaid co-pending patent application.

FIGURE 4 comprises a series of timing and waveform diagrams illustrating the manner of operation of the arrangements shown in FIG. 3.

FIGURE 5 is a schematic diagram illustrating one arrangement for ensuring registration of the moving coil system of the instrument with a predetermined reference, e.g. zero, position.

Figure 6:
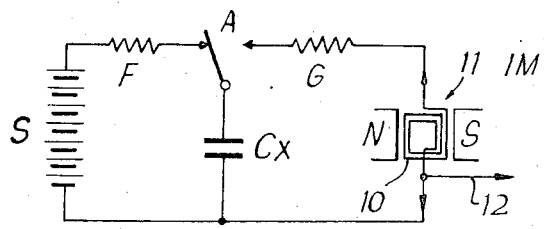

FIGURE 6 is a circuit diagram illustrating the basic method of capacitance measurement used in the present invention.

Figure 7:
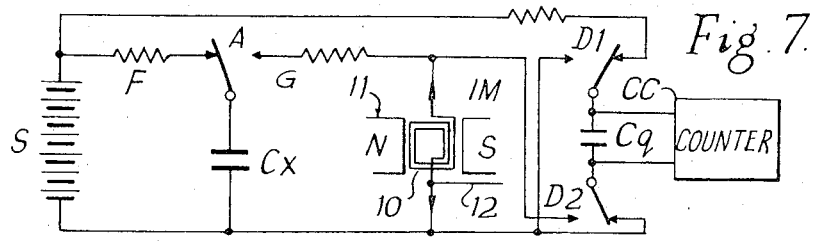

FIGURE 7 is a circuit diagram illustrating a preferred method of capacitance measurement in accordance with this invention for providing a digital form of measurement read-out.

Figure 8:
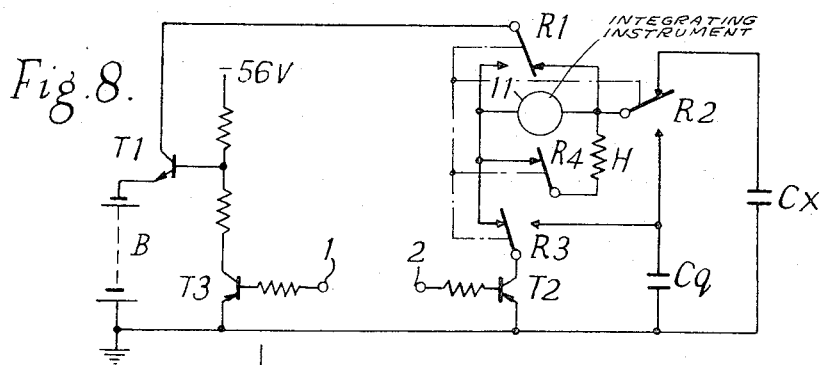

FIGURE 8 is a circuit diagram, similar to FIG. 3, showing a modified arrangement.

Figure 9:
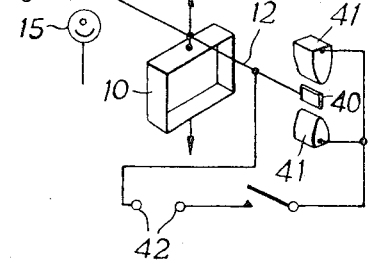

FIGURE 9 is a schematic diagram, similar to FIG. 5, illustrating an alternative arrangement for ensuring registration of the moving coil system of the instrument with a predetermined reference position.

Referring first to FIG. 6 of the drawings, the basic or known method of capacitance measurement employed in the present invention is that of first connecting the test element whose capacitance $Gx$ is under measurement across a current supply source S and then, after the capacitance is fully charged, disconnecting it from the supply source and discharging it through an integrating meter mechanism IM. The latter is shown in the form of a moving coil type instrument movement 11 including a moving coil winding 10 operating in a uniform magnetic flux between opposed magnet poles N, S. As already explained, the moving coil should be free from any applied control torque so that its final deflection position after the capacitance is fully discharged is representative of the capacitance value. If the voltage of the source S is constant and known and the moving coil is brought to a predetermined reference position before the discharge commences, a suitably calibrated scale may be used in conjunction with a pointer attached to the moving coil to provide a direct reading of the measured capacitance value.

The alternate charge and discharge of the capacitance $Cx$ may be controlled by switch means A while series resistors F and G may be provided, if desired, to limit the peak values of the charging and discharging currents.

One arrangement for effecting digital read out is shown in FIG. 1 of the drawings and involves the use of a servo follow-up method under the control of the deflection movement of the moving coil instrument 11. In this arrangement the moving coil 10 of the torqueless m./c. integrating instrument 11 is provided with a radial pointer arm 12 whose free end is provided with a small flag or mask 13 which operates as a light barrier between a light source 14 such as a small electric lamp and a photoelectric device 15, such as a photo-cell or photo-transistor. The light source 14 and the photoelectric device 15 are themselves mounted on an arm 16 carried upon a spindle 17 pivotally mounted for movement about an axis which is coaxial with that of the moving coil 10. The spindle 17 is arranged to be driven through suitable reduction gearing 18 from a servo motor 19 which is energised from a servo amplifier 20 whose input is derived from the output of the photoelectric device 15.

The arrangement is such that, upon movement of the moving coil 10 and the pointer arm 12 to remove the mask 13 from its normal, light obstructing position, between the light source 14 and the photoelectric device 15, the output change from the device 15 causes the servo motor 19 to be energised to move the arm 16 until the light beam between the light source and photoelectric device is again interrupted by the mask 13. The spindle 17 is thus turned through an angle corresponding with the angle of deflection of the moving coil 10. A suitable binary coded disc 21 may be secured to the spindle 17 or to some other part of the mechanism which moves in appropriate angular relationship to such spindle. By the usual known means, such as a further light source 22 on one side of the disc and a group of photocells 23 on the opposite side, a binary coded output signal representing the angular position of the pointer arm 12 may be derived when required.

An alternative read-out arrangement shown in FIG. 2 of the drawings employs a mirror 24 secured to the moving coil 10 and arranged to project a narrow strip of light derived from a light source 25 through a narrow slit 26 in a mask on to a part-cylindrical scale 27 carrying a binary coded pattern 28 of light transmitting and opaque areas. The width of the light strip arriving at the scale 27 is such that only one of the vertical coded sections is illuminated. Photo-cells or like means adapted to be influenced by the light passing through the different zones of the illuminated scale section are arranged to give a direct digital output signal or signals representing the position of the coil 10.

Another arrangement, similar to that of FIG. 2, is one in which the mirror 24 on the moving coil reflects a light spot over a stationary grating-like scale containing a suitable number of separate light transmitting or reflecting areas. The light transmitted by or reflected from each of such areas is collected by a photocell or like means to provide a series of electric pulses which can then be used to operate a suitable electronic digital counter or other equivalent means.

A disadvantage of the arrangements described above is that the relationship between angular movement of the moving coil and the value of input current to the moving coil 10 may not be precisely linear in view of possible or even probable minor non-uniformities in the, assumed, constant magnetic flux density of the magnetic field through which the moving coil 10 turns. This non-linearity necessitates individual calibration or formation of the binary coded scales for each instrument if high accuracy is required.

The present invention is directed to overcome this difficulty by arranging that the moving coil of the integrating device, after deflection by the capacitance discharge current, is returned to its initial starting position by means of a further current or a series of current pulses whose magnitude and duration can be more conveniently measured or prearranged. Thus, if a constant current of accurately known magnitude is applied to drive the deflected moving coil back toward its original reference to zero position, measurement of the time required for the coil to move back to zero position can be used to determine the charge which originally deflected the pointer. An alternative arrangement in accordance with the invention is to supply the moving coil with a series of small, equal and accurately known amounts of charge in a direction to return the moving coil to its initial reference or zero position; counting of the number of such applied charge amounts then serves to provide the required digital output indication. One convenient way of providing such series of return charges is to arrange for a small capacitor to be repeatedly charged to a constant known voltage and then discharged each time through the integrating instrument to return the moving coil to zero position. Alternatively such small capacitor may be charged each time through the instrument and subsequently discharged through a short circuit. The same current pulses may be arranged to provide operating pulses for an electronic counter whose final count state, when the integrating instrument moving coil reaches its reference or zero position, represents the charge value and hence the required capacitance measurement.

Such last mentioned arrangement has the advantage that, if the capacitance under measurement is charged to a given and constant voltage V and if the small quantizing capacitor is also arranged to be charged to the same voltage V, the actual value of such voltage is immaterial. In these circumstances the desired value of the capacitance under measurement is merely the value of the quantizing capacitor multiplied by the number of separate pulses from the latter which are needed to be passed through the moving coil to restore it to zero. Any non-linearities in the integrating instrument due to, for example, non-uniformity of flux in the magnetic gap, are automatically balanced out as they apply equally but in opposing sense to both the measurement and the restoring movements.

Such an arrangement is illustrated in FIG. 7 where the capacitance $C_x$ under measurement is arranged to be charged through switch means A and series resistor F from a current source S and then discharged by way of such switch means A and series resistor G through the integrating meter mechanism IM including the moving coil winding 10. To provide a digital measurement indication of the charge and therefore of the capacitance value, switch means A are again reversed back to the position as shown to remove the capacitance $C_x$ from connection with the meter mechanism. A further capacitance $C_q$, e.g. a fixed capacitor, of accurately known capacitance value and preferably many times smaller than the estimated or expected value of the capacitance $C_x$ is connectable by switch means $D_1$, $D_2$, either across the source S to be charged or across the integrating meter mechanism IM to be discharged. The manner of connection of the capacitance $C_q$ is such that the discharge current therefrom through the moving coil 10 is in the opposite direction to the original discharge current from the capacitance $C_x$. As a result, the moving coil 10 is returned to its initial reference or zero position in a series of discrete steps, the number of which is indicative of the ratio between the respective capacitance values of the known capacitance $C_q$ and the unknown capacitance $C_x$. The number of steps may be registered by mechanical means (not shown) coupled to the switch $D_1$, $D_2$ or, more conveniently when the latter are of non-mechanical character, by means of an electronic counter circuit CC operated by each charge pulse across the capacitance $C_q$.

A particular circuit arrangement for carrying out capacitance measurement in the manner referred to above will now be referred to with reference to FIGS. 3 and 4 of the drawings. In FIG. 3, $Cx$ indicates the large capacitance under measurement (e.g. the capacitance of a signal distribution network as described in the aforesaid copending application) which $Cq$ is the small quantizing capacitor and 11 denotes the integrating instrument. An npn type transistor T1 operates to control charging of the capacitance $Cx$ from a constant voltage source B by way of change-over switch contacts R1, R2, while a transistor T2 of the pnp type operates to control discharge of the same capacitance $Cx$ through the integrating instrument 11. A third transistor T3 of the pnp type controls the operation of transistor T1 by application of a switching voltage to terminal 1. Terminal 2 applies a switching voltage to transistor T2 and the arrangement is such that if terminal 1 is negative and terminal 2 is positive transistor T3 conducts and makes transistor T1 conductive whereas transistor T2 is cut off. Conversely, if terminal 1 is positive and terminal 2 is negative, transistors T3 and T1 are cut off and transistor T2 conducts.

The contacts R1, R2 and those of R3 are associated with a change-over relay whose operating coil is not shown and which is used for control purposes as described later.

When transistor T1 is on and transistor T2 is off the capacitance $Cx$ is fully charged through transistor T1 to −50 v. of source B through relay contacts R1 and R2. The integrating instrument 11 is at this time inoperative since transistor T2 is cut off. When the capacitance $Cx$ is fully charged the control potentials on terminals 1 and 2 are reversed whereby transistor T1 is now cut off and transistor T2 is switched on. Capacitance $Cx$ now discharges through relay contacts R2, the integrating instrument 11, relay contacts R3 and transistor T2 whereby the instrument 11 is deflected and will eventually come to rest at some position dependent upon the charge value in the capacitance $Cx$. The relay is now operated to reverse the positions of contacts R1, R2 and R3 whereby capacitance $Cx$ is disconnected and the quantizing capacitor $Cq$ is placed in circuit. By reversing the control potentials on terminals 1 and 2 once more, transistor T1 is again made conductive and transistor T2 is cut off. The quantizing capacitor $Cq$ is now charged to the voltage of source B through relay contact R1, the integrating instrument 11 and relay contact R2 and the resultant current flow through the instrument 11 will return the moving coil 10 thereof by one step towards zero. The control potentials on terminals 1 and 2 are again reversed whereby transistor T1 is cut off and transistor T2 is made conductive so that the now-charged quantizing capacitor $Cq$ is discharged by way of relay contacts R3 and transistor T2. The process is then repeated by again reversing the control potentials on terminals 1 and 2 so as again to charge capacitor $Cq$ through the instrument 11 and again later to discharge such capacitor through resistor T3. After a number of repetitions dependent on the deflected position of the moving coil 10 of the instrument 11, the coil will be returned to zero. A count of the number of charge pulses applied to capacitor $Cq$ to bring this about, effected by any suitable means such as a binary or other pulse counting system, provides a measure of the charge and, in the case where the capacitance of $Cq$ is of some unit value, such as one microfarad, provides a direct numerical capacitance measurement.

When the capacitance $Cx$ under measurement is of very large capacitance value with accompanying heavy discharge current it may be desirable to arrange for the shunting of the moving coil 10 of the integrating meter mechanism during the discharge phase thereby to reduce the meter sensitivity while restoring such sensitivity during the subsequent return operation using the quantizing capacitance $Cq$. This may be effected as shown in FIG. 8 by the use of a further relay contact R4 operative to control the connection of the shunt resistor H across the integrating meter 11 while the capacitance $Cx$ is being discharged.

The torqueless instrument 11 as referred to above necessarily has no natural zero or reference position and another feature of the invention is concerned with means for determining such a zero or reference position and for maintaining the pointer in register therewith when this is desired and without the use of mechanical stops which can be unsatisfactory.

One arrangement for this purpose is shown in FIG. 5 of the drawings, where the pointer arm 12 is provided near one end with a very small armature 30 of soft iron while, in fixed position at a small distance above or below it and in exact alignment with the chosen zero position, there is located a small electromagnet 31. When the magnet 31 is energised and the pointer arm 12 is in the vicinity of the chosen zero position the armature 30 will be attracted and the pointer will be held in exact register with the chosen zero location. If, coincident with the application of current to the moving coil 10 to cause deflection thereof away from such registered position, the magnet 31 is de-energised, the moving system is then free to commence its deflection precisely from the chosen zero datum line. In the capacitance measuring arrangement as described above with reference to FIG. 3 or 8, it is necessary also to sense when the pointer arm 12 has arrived back at zero position during its return movement so that the return pulse series can be stopped. This is effected by means broadly similar to those of FIG. 1 in that a mask 13 on the pointer arm 12 is arranged to interrupt the light beam between a light source 14 and a light sensitive element 15 such as a photo-transistor.

The diagrams of FIG. 4 illustrate a complete sequence of events when making a charge measurement with the aid of the circuit shown in FIG. 3 or FIG. 8 and an integrating mechanism as described in connection with FIG. 5.

At instant $t0$, transistor T1 is switched on and transistor T2 is switched off to cause charging of the unknown capacitance $Cx$ by the application of suitable potentials to the terminals 1, 2. The zeroizing magnet 31 is at this time energised to hold the meter pointer arm 12 at zero and since the light beam between source 14 and cell 15 is interrupted, the output from the latter is zero.

At time instant $t1$, sufficiently delayed after $t0$ to allow the capacitor $Cx$ to become fully charged in spite of any series line resistance which may be present in the charging circuit, transistor T1 and the zeroizing magnet 31 are each switched off whereby the pointer arm 12 is now free to move. At time instant $t2$ shortly after instant $t1$, transistor T2 is switched on to cause capacitance $Cx$ to discharge through the instrument 11 thereby to deflect the pointer arm 12 towards its maximum deflection position. Immediately the pointer arm 12 is moved away from zero, an output is provided from the cell 15 and is available for use as a control to stop all other operations when it is again interrupted. Transistor T2 is switched off again at time instant $t3$ sufficiently delayed from instant $t2$ to allow full discharge of the capacitance $Cx$ and the relay is simultaneously operated to reverse the position of its contacts R1, R2 and R3 (and R4 if present). Thereafter, at subsequent time instant $t4$, transistor T1 is switched on until time instant $t5$ to charge the quantizing capacitor $Cq$ through the instrument 11 thereby to move the pointer arm 12 of the latter one step backwards towards zero. Subsequently between later time instants $t6$ and $t7$, transistor T2 is on and transistor T1 is off to discharge capacitor $Cq$ while leaving instrument 11 unaffected. Between the still later time instants $t8$–$t9$, transistor T1 is on again and transistor T2 is off to re-charge capacitor $Cq$ and thereafter the process is repeated until, at time instant $tn$, the output from the photocell 15 is interrupted by the arrival of the pointer arm 12 at zero. This marks the end of the measurement and if each of the charge or discharge pulses from capacitor $Cq$ are applied to a counter, the count state of the latter will indicate the charge and hence the capacitance value of the unknown capacitance $Cx$. Such interruption of the current output from the photocell 15 is arranged to inhibit the series of alternate control potentials to the terminals 1, 2 and to reverse the position of the relay contacts R1, R2, R3 (and R4) back to that shown in readiness for the next measurement operation.

As an alternative to the electromagnetic zeroizing arrangements shown in FIG. 5, electrostatic means as shown in FIG. 9 may be employed. These comprise a light electrode tip 40 on one end of the pointer arm 12 and movable between a pair of stationary, preferably wedge-shaped, electrodes 41 coincident with the chosen reference or zero position. Such electrodes 41 are connected in parallel and, under the control of switch means as already described earlier in conjunction with FIG. 5, can be connected to one terminal of a potential source 42 whose opposite terminal is connected to the movable electrode 40. The source 42 may be of either unidirectional or alternating character.

We claim:

1. The method of measuring electrical capacitance which comprises the steps of charging said capacitance to known voltage, discharging the capacitance through an integrating meter mechanism which includes a movable member which is displaced from an initial position to a position representing the current/time integral of the discharge current flow, returning said movable member of said integrating meter mechanism to its initial position by applying to such meter mechanism a series of electric current pulses of known current/time integral value which is many times smaller than the current/time integral value of the discharge current flow of the capacitance under measurement and counting the number of said pulses.

2. The method of measuring electrical capacitance according to claim 1 in which each of said series of electric current pulses of known current/time integral value is derived from the charging of a capacitor of known value to a known voltage.

3. The method of measuring electrical capacitance according to claim 1 in which each of said series of electric current pulses is derived from the discharging of a capacitor of known value from a known voltage.

4. The method of measuring electrical capacitance which comprises the steps of fully charging said capacitance from a source of constant voltage, discharging said capacitance through an integrating meter mechanism which includes a movable member which is displaced from an initial position to a position representing the current/time integral of the discharge current flow, returning said movable member of said integrating meter mechanism to its initial position by applying to such meter mechanism a series of current pulses derived from the charging of a capacitor of known value many times smaller than said capacitance under measurement from said source of constant voltage and counting the number of said pulses.

5. The method of measuring electrical capacitance which comprises the steps of fully charging said capacitance from a source of constant voltage, discharging said capacitance through an integrating meter mechanism which includes a movable member which is displaced from an initial position to a position representing the current/time integral of the discharge current flow, returning said movable member of said integrating meter mechanism to said initial position by applying to such meter mechanism a series of current pulses each derived from the discharge of a capacitor of known value many times smaller than said capacitance under measurement after charging of said capacitor from said source of constant voltage and counting the number of said pulses.

6. Apparatus for measuring the electrical capacitance of a test element which comprises an integrating meter mechanism including a movable member displaceable in accordance with the current/time integral of current flow therethrough, a source of constant potential, a fixed capacitor of known value appreciably smaller than the capacitance value of the test element under measurement, first switch means for connecting said test element in a first charging circuit across said potential source and then in a first discharging circuit across said integrating meter mechanism to displace said movable member away from an initial zero position, second switch means for alternately connecting said known value capacitor in a second charging circuit across said potential source and then in a second discharging circuit, said second charging circuit including said meter mechanism so connected that each of the charging current pulses causes return movement of said movable member towards said initial zero position and means for counting the number of operations of said second switch means necessary to return said movable member to said initial zero position.

7. Apparatus according to claim 6 in which said integrating meter mechanism is a torqueless moving coil type measuring instrument and said movable member is the moving coil of said instrument.

8. Apparatus according to claim 6 which includes a source of repetitive control pulses and in which said first and second switch means each comprise transistor circuit arrangements controlled by said series of control pulses.

9. Apparatus according to claim 7 which includes means for retaining said moving coil of said measuring instrument in a predetermined initial reference position until the application thereto of the current of said first discharging circuit.

10. Apparatus according to claim 9 in which said retaining means include a magnetic armature secured to said moving coil and a stationary electromagnet located at a position coincident with the position of said armature when said moving coil is in said reference position.

11. Apparatus according to claim 9 in which said retaining means comprises an electrode secured to said moving coil, at least one stationary electrode for co-operation with said moving coil electrode located at a position coincident with that of said moving coil electrode when said moving coil is in said reference position and a source of potential for setting up an attractive electrostatic field between said electrodes.

12. Apparatus for measuring the electrical capacitance of a test element which comprises an integrating meter mechanism including a movable member displaceable in accordance with the current/time integral of current flow therethrough, a source of constant potential, a fixed capacitor of known value appreciably smaller than the capacitance value of the test element under measurement, first switch means for connecting said test element in a first charging circuit across said potential source and then in a first discharging circuit across said integrating meter mechanism to displace said movable member away from an initial zero position, second switch means for alternately connecting said known value capacitor in a second charging circuit across said potential source and then in a second discharging circuit, said second discharging circuit including said meter mechanism so connected that each of the discharge current pulses causes return movement of said movable member towards said initial zero position and means for counting the number of operations of said second switch means necessary to return said movable member to said initial zero position.

13. Apparatus according to claim 12 in which said integrating meter mechanism is a torqueless moving coil type measuring instrument and said movable member is the moving coil of said instrument.

14. Apparatus according to claim 12 which includes a source of repetitive control pulses and in which said first and second switch means each comprise transistor circuit arrangements controlled by said series of control pulses.

15. Apparatus according to claim 13 which includes means for retaining said moving coil of said measuring instrument in a predetermined initial reference position until the application thereto of the current of said first discharging current.

16. Apparatus according to claim 15 in which said retaining means include a magnetic armature secured to said moving coil and a stationary electromagnet located at a position coincident with said reference position of said armature when said moving coil is in said reference position.

17. Apparatus according to claim 15 in which said retaining means comprises an electrode secured to said moving coil, at least one stationary electrode for co-operation with said moving coil electrode located at a position coincident with that of said moving coil electrode when said moving coil is in said reference position and a source of potential for setting up an attractive electrostatic field between said electrodes.

References Cited

UNITED STATES PATENTS

| | | | |
|---|---|---|---|
| 1,832,128 | 11/1931 | Klopsteg | 324—102 |
| 2,326,252 | 8/1943 | Rich | 324—154 X |
| 2,356,579 | 8/1944 | Gardner | 324—43 X |
| 2,583,763 | 1/1952 | Blayney | 324—109 |
| 2,806,207 | 9/1957 | Edwards | 324—99 |
| 2,872,641 | 2/1959 | Hudson et al. | 324—99 X |
| 2,883,649 | 4/1959 | King. | |
| 2,975,295 | 3/1961 | Peter | 250—237 |
| 3,187,186 | 6/1965 | Martin | 250—231 |

FOREIGN PATENTS 1,282,307   12/1961   France.

OTHER REFERENCES

Queen Radio-Craft, "Measuring Capacity," July 1949, pp. 602, 603, 635.

RUDOLPH V. ROLINEC, *Primary Examiner.*

E. E. KUBASIEWICZ, *Assistant Examiner.*